US011329781B2

(12) United States Patent
Liu et al.

(10) Patent No.: US 11,329,781 B2
(45) Date of Patent: May 10, 2022

(54) SOUNDING REFERENCE SIGNAL (SRS) TRANSMISSION IN MULTIPLE SRS SYMBOLS IN A SUBFRAME

(71) Applicant: QUALCOMM Incorporated, San Diego, CA (US)

(72) Inventors: Le Liu, Fremont, CA (US); Alberto Rico Alvarino, San Diego, CA (US); Ahmed Omar Desouky Ali, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/786,939

(22) Filed: Feb. 10, 2020

(65) Prior Publication Data

US 2020/0259614 A1    Aug. 13, 2020

Related U.S. Application Data

(60) Provisional application No. 62/804,596, filed on Feb. 12, 2019.

(51) Int. Cl.
*H04W 72/04* (2009.01)
*H04L 5/00* (2006.01)

(52) U.S. Cl.
CPC ....... *H04L 5/0048* (2013.01); *H04W 72/0446* (2013.01); *H04W 72/0453* (2013.01)

(58) Field of Classification Search
CPC ... H04L 5/0048; H04L 5/0094; H04L 5/0051; H04L 5/0053; H04W 72/0446; H04W 72/0453
See application file for complete search history.

(56) References Cited

U.S. PATENT DOCUMENTS

2011/0310821 A1\* 12/2011 Kim ............. H04L 5/0053
370/329
2012/0106495 A1\* 5/2012 Yang ............. H04L 5/0094
370/329

(Continued)

FOREIGN PATENT DOCUMENTS

WO    WO-2017202333 A1 \* 11/2017 ............ H04L 5/00
WO    WO-2018175597 A1 \*  9/2018 ........... H04L 5/0094

OTHER PUBLICATIONS

Ericsson: "Enabling Full TX Power UL Transmission for SRS", 3GPP Draft, R1-1813604, 3GPP TSG-RAN WG1 Meeting #95, Enabling Full TX Power UL Transmission for SRS, 3rd Generation Partnership Project (3GPP), Mobile Competence Centre, 650, Route Des Lucioles, F-06921 Sophia-Antipolis Cedex, vol. RAN WG1, No, Spokane. USA, Nov. 12, 2018-Nov. 16, 2018, Nov. 11, 2018 (Nov. 11, 2018), XP051555660, 8 Pages, Retrieved from the Internet: URL: http://www.3gpp.org/ftp/Meetings%5F3GPP%5FSYNC/RAN1/Docs/R1%2D1813604%2Ezip [retrieved on Nov. 11, 2018].

(Continued)

*Primary Examiner* — Jay P Patel
(74) *Attorney, Agent, or Firm* — Patterson & Sheridan, L.L.P

(57) ABSTRACT

Certain aspects of the present disclosure relate to techniques for sounding reference signal (SRS) transmission in multiple SRS symbols in a subframe based on multiple SRS configurations, including determining for each of the multiple symbols a SRS pattern index. In some examples, the present disclosure provides a method of wireless communication by a user equipment (UE). In certain aspects, the method includes receiving, from a base station, information corresponding to a plurality of SRS configurations for a subframe, and determining a plurality of symbols in the subframe for (Continued)

transmitting SRS based on the plurality of SRS configurations.

30 Claims, 12 Drawing Sheets

(56) References Cited

U.S. PATENT DOCUMENTS

| | | | | |
|---|---|---|---|---|
| 2012/0275411 A1* | 11/2012 | Kim | ............... | H04L 5/0032 |
| | | | | 370/329 |
| 2014/0169316 A1* | 6/2014 | Kim | ............... | H04L 5/0048 |
| | | | | 370/329 |
| 2015/0071196 A1* | 3/2015 | Park | ............... | H04W 72/042 |
| | | | | 370/329 |
| 2016/0007406 A1* | 1/2016 | Yi | ............... | H04W 24/02 |
| | | | | 370/252 |
| 2017/0048717 A1* | 2/2017 | Yoo | ............... | H04W 72/0453 |
| 2017/0141901 A1* | 5/2017 | Rico Alvarino | .. | H04W 72/0446 |
| 2017/0289995 A1* | 10/2017 | Lin | ............... | H04W 72/0446 |
| 2018/0183552 A1* | 6/2018 | Hosseini | ............... | H04L 5/0082 |
| 2018/0279297 A1* | 9/2018 | Nogami | ............... | H04W 72/042 |
| 2019/0037601 A1* | 1/2019 | Noh | ............... | H04L 27/0006 |
| 2020/0204407 A1* | 6/2020 | Liu | ............... | H04L 27/2607 |
| 2020/0322187 A1* | 10/2020 | He | ............... | H04L 5/0055 |

OTHER PUBLICATIONS

Huawei., et al., "On SRS Antenna Switching for 4 Transmission Ports", 3GPP Draft, 3GPP TSG RAN WG1 Meeting #92, R1-1801871, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 16, 2018 (Feb. 16, 2018), XP051397438, 5 Pages, Retrieved from the Internet: URL:http://www.3gpp.org/ftp/tsg%5Fran/WG1%5FRL1/TSGR1%5F92/Docs/ [retrieved on Feb. 16, 2018] Section 2, p. 1-p. 4, Figure 1, Table 2.

Huawei., et al., "On Support of SRS Antenna Switching for 1T4R and 2T4R Antenna Configurations", 3GPP Draft, R1-1803957, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. RAN WG1. No, Sanya, China, Apr. 16, 2018-Apr. 20, 2018, Apr. 15, 2018 (Apr. 15, 2018), XP051426246, 7 Pages, Retrieved from the Internet: URL: http://www.3gpp.org/ftp/Meetings%5F3GPP%5FSYNC/RAN1/Docs/ [retrieved on Apr. 15, 2018].

International Search Report and Written Opinion—PCT/US2020/017686—ISA/EPO—dated May 26, 2020.

* cited by examiner

| | UpPTS SRS symbols in subframe 1 of the radio frame $n_f$ | | | | ... | UpPTS SRS symbols in subframe 1 of the radio frame ($n_f$+1) | | | | |
|---|---|---|---|---|---|---|---|---|---|---|
| | For UE with 4 additional symbols in UpPTS | | | | | For UE with 2 symbols in UpPTS | | For UE with 4 additional symbols in UpPTS | | |
| ... | 1st symbol | 2nd symbol | 3rd symbol | 4th symbol | ... | 1st symbol | 2nd symbol | 1st symbol | 2nd symbol | ... |
| $k_{SRS}$ | 0 | 1 | 2 | 3 | | 0 | 1 | 0 | 1 | |
| $n_{SRS}$ | $2n_f$ | $2n_f+1$ | $2n_f$ | $2n_f+1$ | | $2n_f$ | $2n_f+1$ | $2(n_f+1)$ | $2(n_f+1)+1$ | |

1st Configuration  2st Configuration  3rd Configuration

FIG. 7

| | UpPTS SRS symbols in subframe 1 of the radio frame $n_f$ | | | | ... | UpPTS SRS symbols in subframe 1 of the radio frame ($n_f$+1) | | | | |
|---|---|---|---|---|---|---|---|---|---|---|
| | For UE with 4 additional symbols in UpPTS | | | | | For UE with 2 symbols in UpPTS | | For UE with 4 additional symbols in UpPTS | | |
| ... | 1st symbol | 2nd symbol | 3rd symbol | 4th symbol | ... | 1st symbol | 2nd symbol | 1st symbol | 2nd symbol | ... |
| $k_{SRS}$ | 0 | 1 | 2 | 3 | | 0 | 1 | 0 | 1 | |
| $n_{SRS}$ | $n_f$ | $n_f$ | $n_f$ | $n_f$ | | $n_f$ | $n_f$ | $(n_f+1)$ | $(n_f+1)$ | |

1st Config  2nd  3rd  4th  5th  6th

FIG. 8

| | UpPTS SRS symbols in subframe 1 of the radio frame $n_f$ | | | | | | UpPTS SRS symbols in subframe 1 of the radio frame $n_f+1$ | | | | | |
|---|---|---|---|---|---|---|---|---|---|---|---|---|
| | For UE with 4 additional symbols in UpPTS | | | | For UE with 2 symbols in UpPTS | | For UE with 4 additional symbols in UpPTS | | | | For UE with 2 symbols in UpPTS | |
| ... | 1st symbol | 2nd symbol | 3rd symbol | 4th symbol | 1st symbol | 2nd symbol | 1st symbol | 2nd symbol | 3rd symbol | 4th symbol | 1st symbol | 2nd symbol |
| $k_{SRS}$ | 0 | 1 | 2 | 3 | 0 | 1 | 0 | 1 | 2 | 3 | 0 | 1 |
| $n_{SRS}$ | $2n_f$ | $2n_f+1$ | $2n_f$ | $2n_f+1$ | $2n_f$ | $2n_f+1$ | $2(n_f+1)$ | $2(n_f+1)+1$ | $2(n_f+1)$ | $2(n_f+1)+1$ | $2(n_f+1)$ | $2(n_f+1)+1$ |
| SRS AS 1T2R or 2T4R $a_{srs}$ | 0 | 1 | 0 | 1 | 0 | 1 | 0 | 1 | 0 | 1 | 0 | 1 |
| SRS AS 1T4R $a_{srs}$ | 0 | 1 | 2 | 3 | 0 | 1 | 0 | 1 | 2 | 3 | 0 | 1 |
| $n_{SRS}$ | $n_f$ | $n_f$ | $n_f$ | $n_f$ | $n_f$ | $n_f$ | $(n_f+1)$ | $(n_f+1)$ | $(n_f+1)$ | $(n_f+1)$ | $(n_f+1)$ | $(n_f+1)$ |
| SRS AS 1T2R or 2T4R $a_{srs}$ | 0 | 0 | 0 | 0 | 0 | 0 | 1 | 1 | 1 | 1 | 1 | 1 |
| SRS AS 1T4R $a_{srs}$ | 0 | 0 | 0 | 0 | 0 | 0 | 1 | 1 | 1 | 1 | 1 | 1 |

FIG. 9

| | UpPTS SRS symbols in subframe 1 of the radio frame $n_f$ | | | | | | ... | UpPTS SRS symbols in subframe 1 of the radio frame $n_f+1$ | | | | | |
|---|---|---|---|---|---|---|---|---|---|---|---|---|---|
| | For UE with 4 additional symbols in UpPTS | | | | For UE with 2 symbols in UpPTS | | | For UE with 4 additional symbols in UpPTS | | | | For UE with 2 symbols in UpPTS | |
| | 1st symbol | 2nd symbol | 3rd symbol | 4th symbol | 1st symbol | 2nd symbol | ... | 1st symbol | 2nd symbol | 3rd symbol | 4th symbol | 1st symbol | 2nd symbol |
| ... | | | | | | | ... | | | | | | |
| $k_{SRS}$ | 0 | 1 | 2 | 3 | 0 | 1 | ... | 0 | 1 | 2 | 3 | 0 | 1 |
| $n_{SRS}$ | $2n_f$ | $2n_f+1$ | | | $2n_f$ | $2n_f+1$ | ... | $2(n_f+1)$ | $2(n_f+1)+1$ | $2(n_f+1)$ | $2(n_f+1)+1$ | $2(n_f+1)$ | $2(n_f+1)+1$ |
| SRS AS 1T4R $a_{SRS}$ | 0 | 1 | | | 2 | 3 | ... | | | | | 0 | 1 |
| | 1st Configuration | | | | 2nd Configuration | | | 1st Configuration | | | | 2nd Configuration | |

FIG. 11

| | UpPTS SRS symbols in subframe 1 of the radio frame $n_f$ | | | | | | UpPTS SRS symbols in subframe 1 of the radio frame $n_f+1$ | | | | | |
|---|---|---|---|---|---|---|---|---|---|---|---|---|
| | For UE with 4 additional symbols in UpPTS | | | | For UE with 2 symbols in UpPTS | | For UE with 4 additional symbols in UpPTS | | | | For UE with 2 symbols in UpPTS | |
| | 1st symbol | 2nd symbol | 3rd symbol | 4th symbol | 1st symbol | 2nd symbol | 1st symbol | 2nd symbol | 3rd symbol | 4th symbol | 1st symbol | 2nd symbol |
| ... | ... | ... | ... | ... | ... | ... | ... | ... | ... | ... | ... | ... |
| $k_{SRS}$ | 0 | 1 | 2 | 3 | 0 | 1 | 0 | 1 | 2 | 3 | 0 | 1 |
| $n_{SRS}$ | $4n_f$ | $4n_f+1$ | | | $4n_f+2$ | $4n_f+3$ | $4(n_f+1)$ | $4(n_f+1)+1$ | | | $4(n_f+1)+2$ | $4(n_f+1)+3$ |
| SRS AS 1T4R $a_{SRS}$ | 0 | 1 | 2 | 3 | 2 | 3 | 0 | 1 | 2 | 3 | 2 | 3 |
| | 1st Configuration | | | | 2nd Configuration | | 1st Configuration | | | | 2nd Configuration | |

FIG. 12

SOUNDING REFERENCE SIGNAL (SRS) TRANSMISSION IN MULTIPLE SRS SYMBOLS IN A SUBFRAME

CROSS-REFERENCE TO RELATED APPLICATION

This application claims benefit of and priority to U.S. Provisional Application No. 62/804,596, filed Feb. 12, 2019, which is hereby assigned to the assignee hereof and hereby expressly incorporated by reference herein in its entirety as if fully set forth below and for all applicable purposes.

BACKGROUND

Field of the Disclosure

Certain aspects of the present disclosure generally relate to wireless communications and, more particularly, to techniques for SRS transmission in multiple SRS symbols in a subframe based on multiple SRS configurations, including determining for each of the multiple symbols a SRS pattern index.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, Orthogonal Frequency Division Multiple Access (OFDMA) systems, and 5th generation wireless systems (5G) such as new radio (NR) systems.

Generally, a wireless multiple-access communication system can simultaneously support communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. This communication link may be established via a single-input single-output, multiple-input single-output or a multiple-input multiple-output (MIMO) system.

SUMMARY

Certain aspects of the present disclosure provide a method of wireless communication by a user equipment (UE). The method includes receiving information corresponding to a plurality of sounding reference signal (SRS) configurations for a subframe. The method further includes determining a plurality of symbols in the subframe for transmitting SRS based on the plurality of SRS configurations. The method further includes determining, for each of the plurality of symbols, a SRS pattern index based on a function having a value equal to a number of the plurality of SRS configurations. The method further includes transmitting SRS in each of the plurality of symbols based on the corresponding SRS pattern index.

Certain aspects of the present disclosure provide a method of wireless communication by a UE. The method includes receiving information corresponding to a plurality of SRS configurations for a subframe, the information comprising an indication of a starting antenna index or a starting antenna pair index for each of the plurality of SRS configurations. The method further includes determining a plurality of symbols in the subframe for transmitting SRS based on the plurality of SRS configurations. The method further includes determining, for each of the plurality of symbols, a SRS pattern index based on the received information. The method further includes, for each of the plurality of symbols, determining at least one antenna or at least one antenna pair to use for transmitting the SRS based on the corresponding SRS pattern index and starting antenna index or starting antenna pair index, and transmitting the SRS on the at least one antenna or the at least one antenna pair in the symbol.

Certain aspects of the present disclosure provide a UE comprising a memory, and a processor communicatively coupled to the memory. In certain aspects, the processor is configured to receive information corresponding to a plurality of sounding reference signal (SRS) configurations for a subframe. In certain aspects, the processor is configured to determine a plurality of symbols in the subframe for transmitting SRS based on the plurality of SRS configurations. In certain aspects, the processor is configured to determine, for each of the plurality of symbols, a SRS pattern index based on a function having a value equal to a number of the plurality of SRS configurations. In certain aspects, the processor is configured to transmit SRS in each of the plurality of symbols based on the corresponding SRS pattern index.

Certain aspects of the present disclosure provide a UE, comprising: a memory, and a processor communicatively coupled to the memory. In certain aspects, the processor is configured to: receive information corresponding to a plurality of sounding reference signal (SRS) configurations for a subframe, the information comprising an indication of a starting antenna index or a starting antenna pair index for each of the plurality of SRS configurations. In certain aspects, the processor is configured to determine a plurality of symbols in the subframe for transmitting SRS based on the plurality of SRS configurations. In certain aspects, the processor is configured to determine, for each of the plurality of symbols, a SRS pattern index based on the received information, and for each of the plurality of symbols, determining at least one antenna or at least one antenna pair to use for transmitting the SRS based on the corresponding SRS pattern index and starting antenna index or starting antenna pair index. In certain aspects, the processor is configured to transmit the SRS on the at least one antenna or the at least one antenna pair in the symbol.

Certain aspects of the present disclosure provide a non-transitory computer-readable storage medium storing instructions which, when executed by a user equipment (UE), perform operations for SRS transmission in multiple SRS symbols in a subframe based on multiple SRS configurations. In some examples, the operations include receiving information corresponding to a plurality of SRS configurations for a subframe, the information comprising an indication of a starting antenna index or a starting antenna pair index for each of the plurality of SRS configurations. The operations further include determining a plurality of symbols in the subframe for transmitting SRS based on the plurality of SRS configurations. The operations further include determining, for each of the plurality of symbols, a SRS pattern index based on the received information. The operations further include, for each of the plurality of symbols, determining at least one antenna or at least one antenna pair to use for transmitting the SRS based on the corresponding SRS pattern index and starting antenna index or starting antenna pair index, and transmitting the SRS on the at least one antenna or the at least one antenna pair in the symbol.

Certain aspects of the present disclosure provide a user equipment (UE) configured for wireless communication. In some examples, the UE includes means for receiving information corresponding to a plurality of SRS configurations for a subframe, the information comprising an indication of a starting antenna index or a starting antenna pair index for each of the plurality of SRS configurations. In some examples, the UE includes means for determining a plurality of symbols in the subframe for transmitting SRS based on the plurality of SRS configurations. In some examples the UE further includes means for determining, for each of the plurality of symbols, a SRS pattern index based on the received information. In some examples, the UE further includes means for each of the plurality of symbols, at least one antenna or at least one antenna pair to use for transmitting the SRS based on the corresponding SRS pattern index and means for starting antenna index or starting antenna pair index, and transmitting the SRS on the at least one antenna or the at least one antenna pair in the symbol.

Certain aspects of the present disclosure provide a non-transitory computer-readable storage medium storing instructions which, when executed by a user equipment (UE), perform operations for SRS transmission in multiple SRS symbols in a subframe based on multiple SRS configurations. In some examples, the operations include receiving information corresponding to a plurality of SRS configurations for a subframe, the information comprising an indication of a starting antenna index or a starting antenna pair index for each of the plurality of SRS configurations. The operations further include determining a plurality of symbols in the subframe for transmitting SRS based on the plurality of SRS configurations. The operations further include determining, for each of the plurality of symbols, a SRS pattern index based on the received information. The operations further include, for each of the plurality of symbols, determining at least one antenna or at least one antenna pair to use for transmitting the SRS based on the corresponding SRS pattern index and starting antenna index or starting antenna pair index, and transmitting the SRS on the at least one antenna or the at least one antenna pair in the symbol.

Certain aspects of the present disclosure provide a user equipment (UE) configured for wireless communication. In some examples, the UE includes means for receiving information corresponding to a plurality of SRS configurations for a subframe, the information comprising an indication of a starting antenna index or a starting antenna pair index for each of the plurality of SRS configurations. The UE may also include means for determining a plurality of symbols in the subframe for transmitting SRS based on the plurality of SRS configurations. The UE may further include determining, for each of the plurality of symbols, a SRS pattern index based on the received information. The UE may also include, for each of the plurality of symbols, determining at least one antenna or at least one antenna pair to use for transmitting the SRS based on the corresponding SRS pattern index and starting antenna index or starting antenna pair index, and transmitting the SRS on the at least one antenna or the at least one antenna pair in the symbol.

Aspects of the present disclosure provide means for, apparatus, processors, and computer-readable mediums for performing techniques and methods that may be complementary to the operations performed by a UE described herein, such as by a base station (BS).

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-U), etc.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates a table showing uplink pilot time slot (UpPTS) symbols and $n_{SRS}$ for UpPTS symbols corresponding to example SRS configurations, in accordance with certain aspects of the disclosure.

FIG. 8 illustrates a table showing UpPTS symbols and $n_{SRS}$ for UpPTS symbols corresponding to example SRS configurations, in accordance with certain aspects of the disclosure.

FIG. 9 illustrates a table showing UpPTS symbols and $n_{SRS}$ for UpPTS symbols corresponding to example SRS configurations, in accordance with certain aspects of the disclosure.

FIG. 11 illustrates a table showing UpPTS symbols and $n_{SRS}$ for UpPTS symbols corresponding to example SRS configurations, in accordance with certain aspects of the disclosure.

FIG. 12 illustrates a table showing UpPTS symbols and $n_{SRS}$ for UpPTS symbols corresponding to example SRS configurations, in accordance with certain aspects of the disclosure.

DETAILED DESCRIPTION

Figure 1:
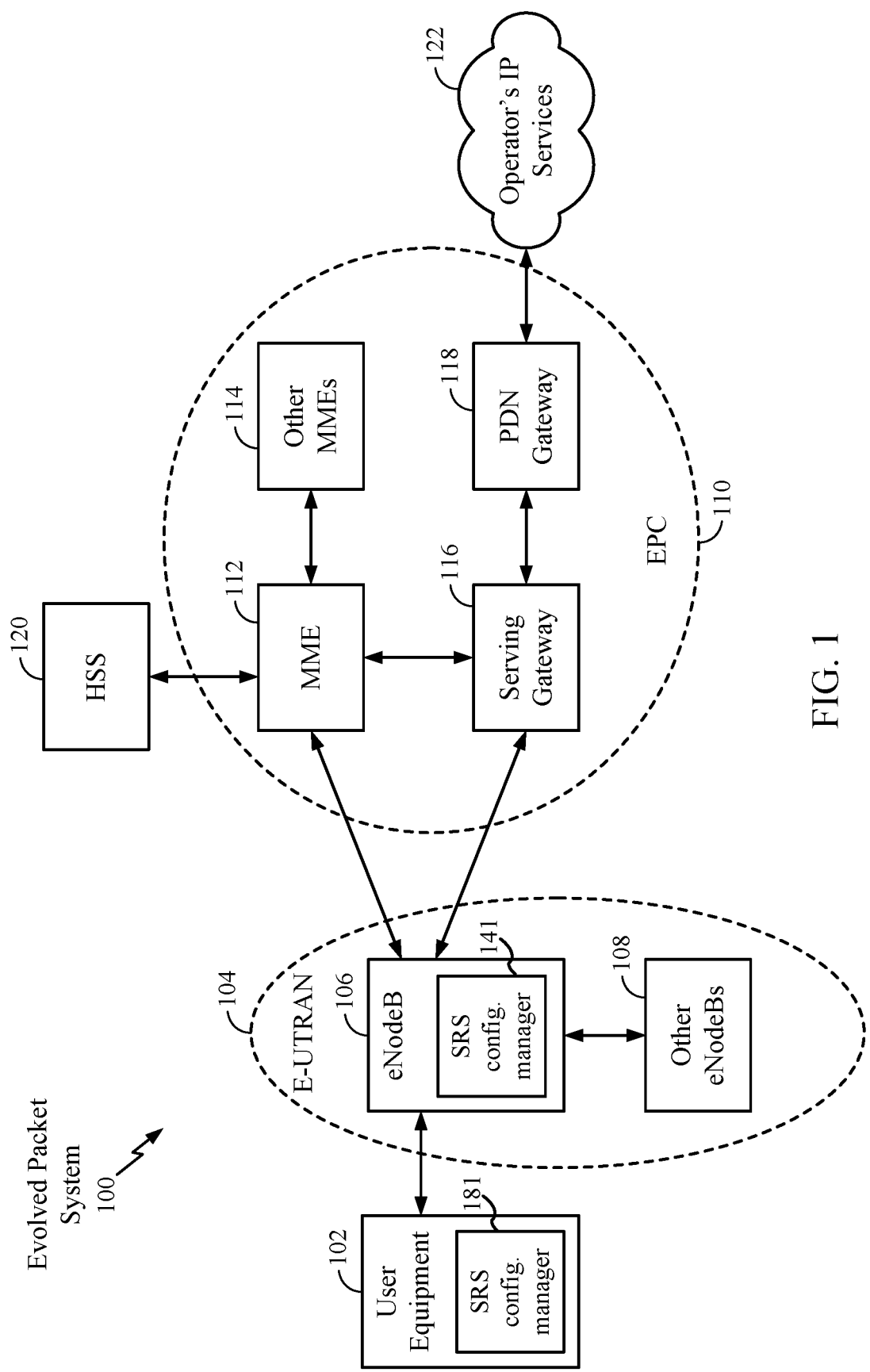
FIG. 1 is a diagram illustrating an example of a network architecture.

According to aspects of the present disclosure, techniques are provided for SRS transmission in multiple SRS symbols in a subframe based on multiple SRS configurations, including determining for each of the multiple symbols a SRS pattern index. For example, the SRS pattern index for a symbol may be used to determine one or more frequencies in which to transmit SRS in the symbol. Additionally or alternatively, the SRS pattern index for a symbol may be used to determine one or more antennas in which to transmit SRS in the symbol. Accordingly, the techniques provided herein provide for improved SRS transmission when using frequency hopping or antenna switching, as discussed further herein.

Though aspects of the present disclosure are described with respect to LTE systems, the aspects may also be used for other appropriate wireless communication networks, such as those implementing 5G systems, NR systems, and systems using different types of radio technologies.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced. For example, in certain aspects, the eNB 106 is configured to configure UE 102 with a plurality of SRS configurations for a subframe, such as using radio resource control (RRC) signaling. Further, in certain aspects, UE 102 is configured to determine a plurality of symbols in which to transmit SRS in the subframe based on the plurality of SRS configurations and determine for each of the plurality of symbols a SRS pattern index to use to transmit the SRS.

According to certain aspects, the eNB 106 and UE 102 may be configured for SRS transmission in multiple SRS symbols in a subframe based on multiple SRS configurations. As shown in FIG. 1, the eNB 106 includes an SRS configuration manager 141. The SRS configuration manager 141 may be configured for generating information corresponding to a plurality of SRS configurations for a subframe, and transmitting the information to the UE 102, according to aspects described herein. As shown in FIG. 1, the UE 102 includes an SRS configuration manager 181. The SRS configuration manager 181 may be configured to receive information corresponding to a plurality of SRS configurations, and determine a plurality of symbols in the subframe for transmitting SRS based on the information, according to aspects described herein.

The LTE network architecture 100 may be referred to as an evolved packet system (EPS) 100. The EPS 100 may include one or more user equipment (UE) 102, an evolved UMTS terrestrial radio access network (E-UTRAN) 104, an evolved packet core (EPC) 110, a home subscriber server (HSS) 120, and an operator's IP Services 122. The EPS can interconnect with other access networks, but for simplicity those entities/interfaces are not shown. Exemplary other access networks may include an IP multimedia subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station (BS), a base transceiver station, a radio base station, a radio transceiver, a transceiver function, a basic service set (BSS), an extended service set, an access point, or some other suitable terminology, such as a gNB in 5G NR. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a mobility management entity (MME) 112, other MMEs 114, a serving gateway 116, and a packet data network (PDN) gateway 118. The MME 112 is the control node that processes the signaling between the UE 102 and the EPC 110. Generally, the MME 112 provides bearer and connection management. All user IP packets are transferred through the serving gateway 116, which itself is connected to the PDN Gateway 118. The PDN Gateway 118 provides UE IP address allocation as well as other functions. The PDN Gateway 118 is connected to the operator's IP Services 122. The operator's IP Services 122 may include, for example, the Internet, the Intranet, an IP multimedia subsystem (IMS), and a PS (packet-switched) streaming service (PSS). In this manner, the UE 102 may be coupled to the PDN through the LTE network.

Figure 2:
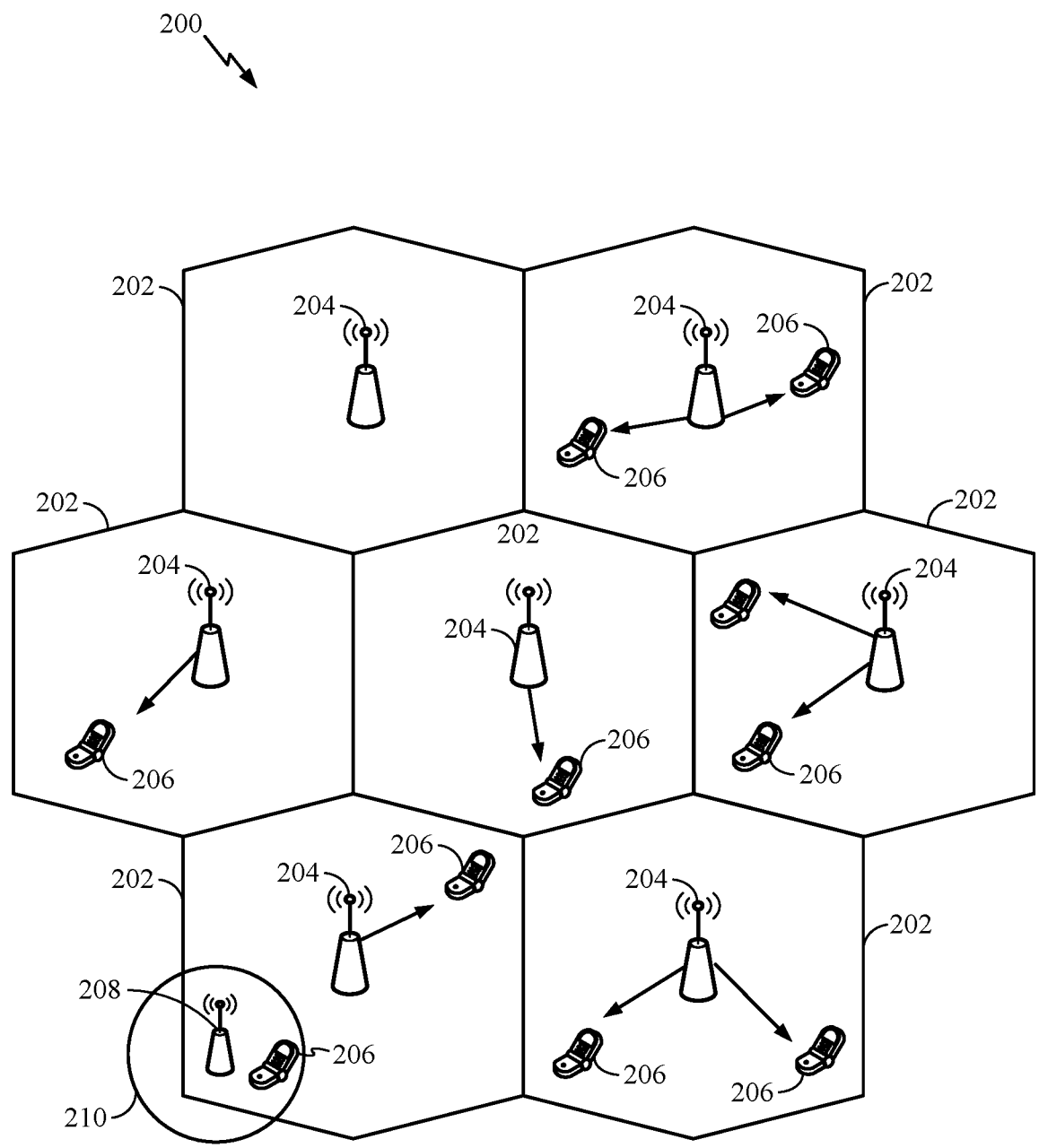
FIG. 2 is a diagram illustrating an example of an access network.

FIG. 2 is a diagram illustrating an example of an access network 200 in an LTE network architecture in which aspects of the present disclosure may be practiced.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

Since UEs 206 may be mobile, they may move from a cell 202/region 210 associated with one eNB 204/208 to a cell 202/region 210 associated with another eNB 204/208. Further, the UE 206 may have an active session, (e.g., ongoing call or data session) during the movement from one cell 202/region 210 to another. For example, a UE 206 may be moving away from one eNB 204/208 and toward another eNB 204/208, while in a session and communicating in the network 200. Accordingly, the UE 206 may move out of one cell 202/region 210 and into another cell 202/region 210. In order to maintain the session, therefore, the UE 206 may need to have the session handed over from the source eNB 204/208 to the target eNB 204/208, so that the UE 206 can communicate via the target eNB 204/208. Such a handover may occur, for example, while the 206 is in an area covered by both the source eNB 204/208 and the target eNB 204/208, meaning the UE 206 is able to communicate with both the source eNB 204/208 and the target eNB 204/208.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to evolution-data optimized (EV-DO) or ultra-mobile broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing wideband-CDMA (W-CDMA) and other variants of CDMA, such as TD-SCDMA; global system for mobile communications (GSM) employing TDMA; and evolved UTRA (E-UTRA), ultra-mobile broadband (UMB), IEEE 802.11 (Wi-Fi), IEEE 802.16 (WiMAX), IEEE 802.20, flash-OFDM employing OFDMA, 5G, NR, etc. UTRA, E-UTRA, UMTS, LTE, NR, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
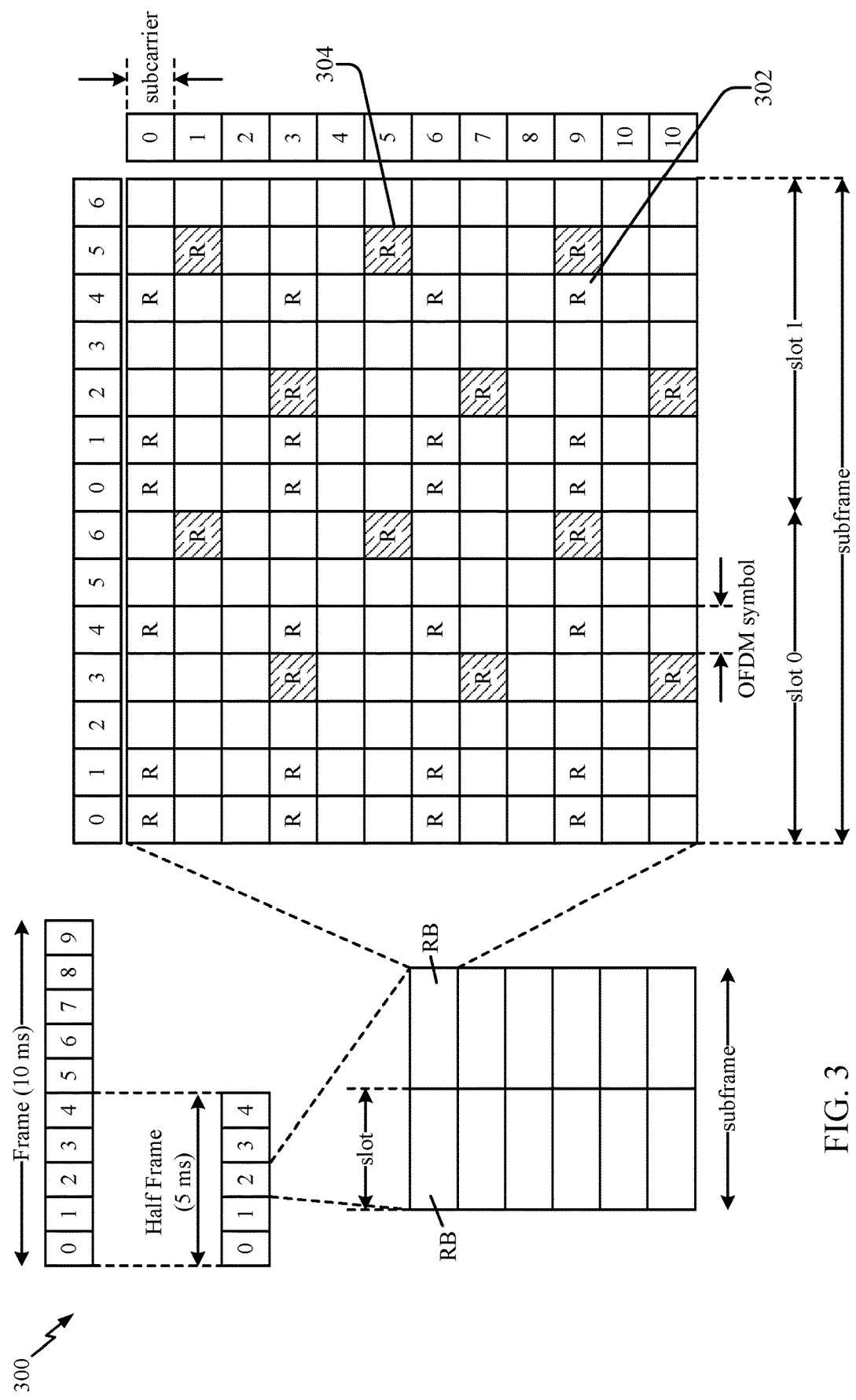
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9, with a half frame (5 ms) containing 5 sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Since each sub-frame is made up of 2 time slots, and thus 2 resource blocks, each sub-frame includes 14 OFDM symbols. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks (RBs) that a UE receives and the higher the modulation scheme, the higher the data rate for the UE.

In LTE, in certain aspects, an eNB may send a primary synchronization signal (PSS) and a secondary synchronization signal (SSS) for each cell in the eNB. The synchronization signals may be used by UEs for cell detection and acquisition. The eNB may also send a physical broadcast channel (PBCH). The PBCH may carry certain system information.

The eNB may send a physical control format indicator channel (PCFICH) in the first symbol period of each sub-frame. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a physical HARQ indicator channel (PHICH) and a physical downlink control channel (PDCCH) in the first M symbol periods of each subframe. The PHICH may carry information to support hybrid automatic repeat request (HARQ). The PDCCH may carry information on resource allocation for UEs and control information for downlink channels. The eNB may send a physical downlink shared channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
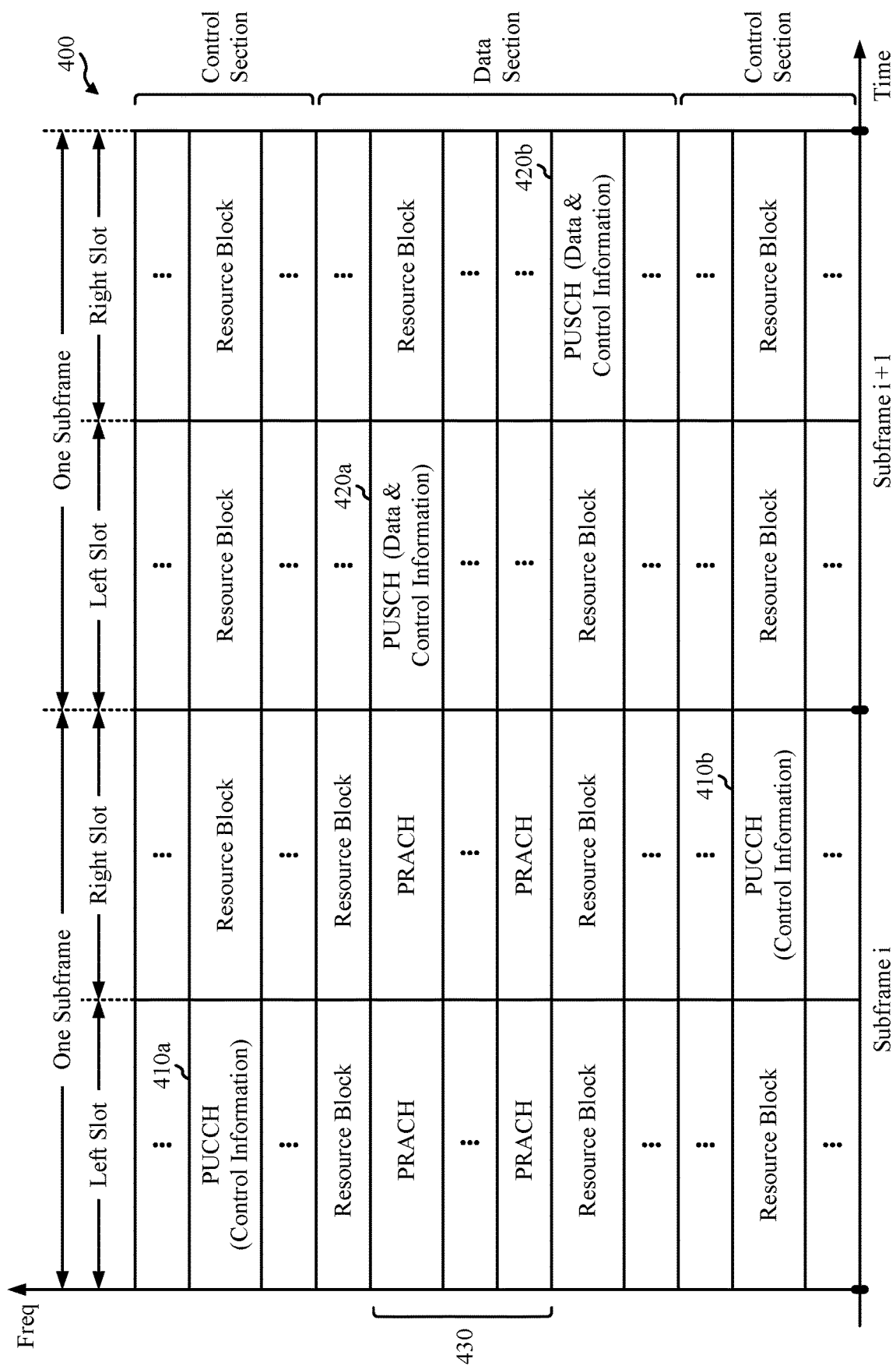
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
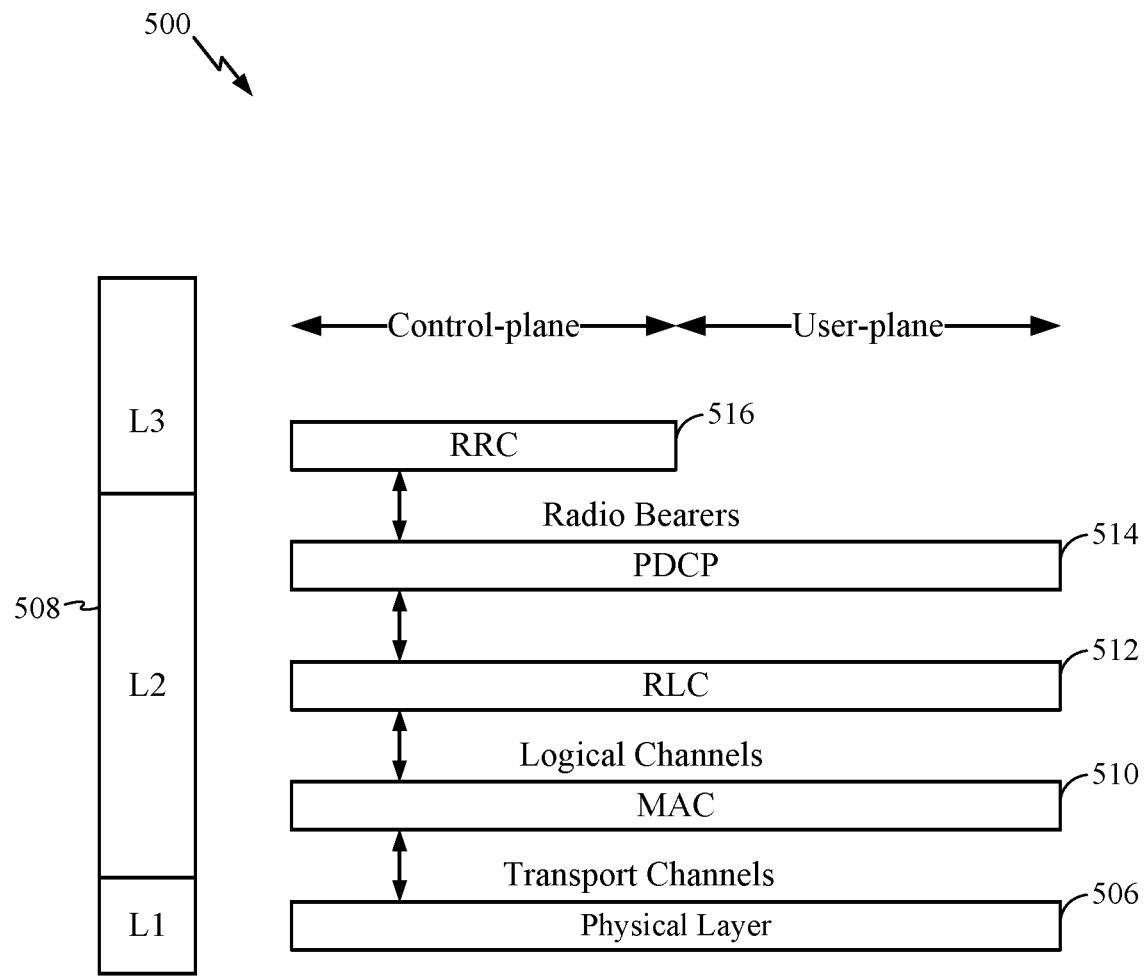
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
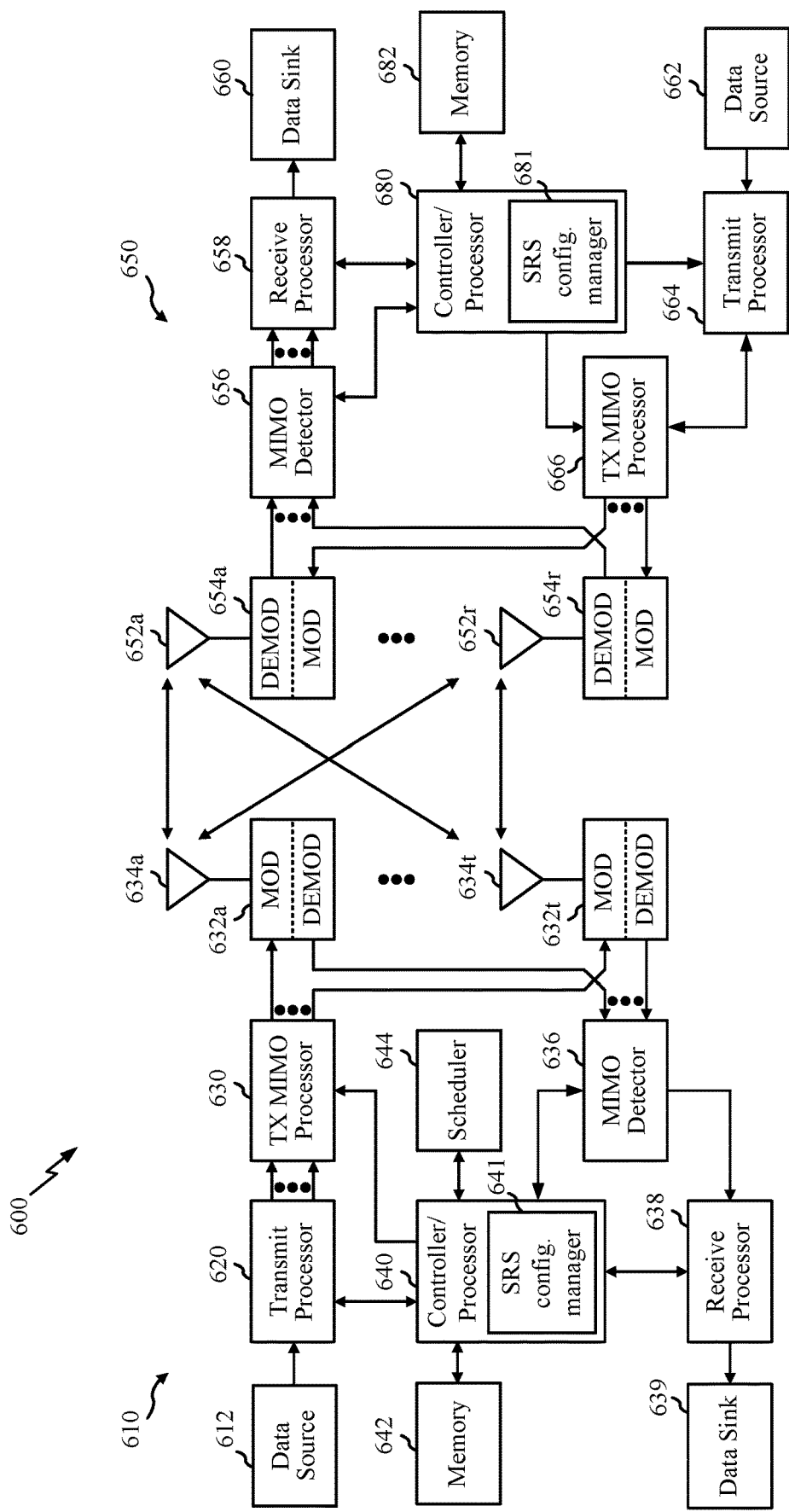
FIG. 6 is a diagram illustrating an example of an evolved Node B (eNB) and user equipment in an access network, in accordance with certain aspects of the disclosure.

FIG. 6 is a block diagram 600 illustrating components of an eNB 610 (e.g., eNB 106 of FIG. 1) and a UE 650 (e.g., UE 102 of FIG. 1) in an access network, in which aspects of the present disclosure may be practiced. At the BS 610, a transmit processor 620 may receive data from a data source 612 and control information from a controller/processor 640. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 620 may process (e.g., encode and symbol map) the data and control information to obtain data symbols and control symbols, respectively. The transmit processor 620 may also generate reference symbols, such as for the primary synchronization signal (PSS), secondary synchronization signal (SSS), and channel state information reference signal (CSI-RS). A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a-632t. Each modulator 632 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 632a-632t may be transmitted via the antennas 634a-634t, respectively.

At the UE 650, the antennas 652a-652r may receive the downlink signals from the BS 610 and may provide received signals to the demodulators (DEMODs) in transceivers 654a-654r, respectively. Each demodulator 654 may condition (e.g., filter, amplify, downconvert, and digitize) a respective received signal to obtain input samples. Each demodulator may further process the input samples (e.g., for OFDM, etc.) to obtain received symbols. A MIMO detector 656 may obtain received symbols from all the demodulators 654a-654r, perform MIMO detection on the received symbols if applicable, and provide detected symbols. A receive processor 658 may process (e.g., demodulate, deinterleave, and decode) the detected symbols, provide decoded data for the UE 650 to a data sink 660, and provide decoded control information to a controller/processor 680.

On the uplink, at UE 650, a transmit processor 664 may receive and process data (e.g., for the physical uplink shared channel (PUSCH)) from a data source 662 and control information (e.g., for the physical uplink control channel (PUCCH) from the controller/processor 680. The transmit processor 664 may also generate reference symbols for a reference signal (e.g., for the sounding reference signal (SRS)). The symbols from the transmit processor 664 may be precoded by a TX MIMO processor 666 if applicable, further processed by the modulators in transceivers 654a-654r (e.g., for SC-FDM, etc.), and transmitted to the BS 610. At the BS 610, the uplink signals from the UE 650 may be received by the antennas 634, processed by the modulators 632, detected by a MIMO detector 636 if applicable, and further processed by a receive processor 638 to obtain decoded data and control information sent by the UE 650. The receive processor 638 may provide the decoded data to a data sink 639 and the decoded control information to the controller/processor 640.

The memories 642 and 682 may store data and program codes for BS 610 and UE 650, respectively. A scheduler 644 may schedule UEs for data transmission on the downlink and/or uplink.

Antennas 652, processors 666, 658, 664, and/or controller/processor 680 of the UE 650 and/or antennas 634, processors 620, 630, 638, and/or controller/processor 640 of the BS 610 may be used to perform the various techniques and methods described herein. For example, as shown in FIG. 6, the controller/processor 640 of the BS 610 has an SRS configuration manager 641 that may be configured for generating information corresponding to a plurality of SRS configurations for a subframe, and transmitting the information to the UE 650, according to aspects described herein. As shown in FIG. 6, the controller/processor 680 of the UE 650 has an SRS configuration manager 681 that may be configured for receiving information corresponding to a plurality of SRS configurations, and determining a plurality of symbols in the subframe for transmitting SRS based on the information, according to aspects described herein. Although shown at the controller/processor, other components of the UE 650 and BS 610 may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 10:
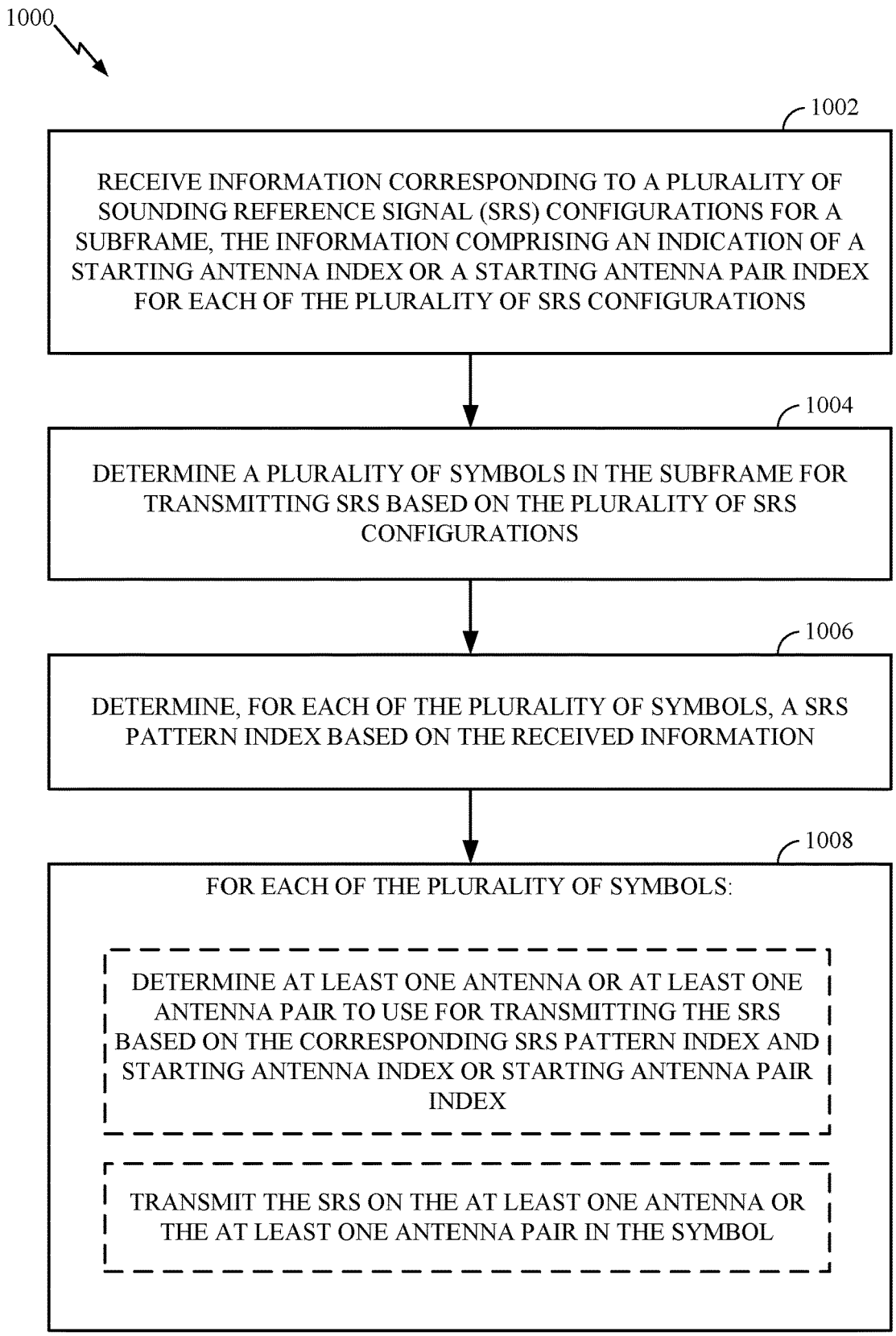
FIG. 10 illustrates example operations for SRS transmission by a UE, in accordance with certain aspects of the present disclosure.
Figure 13:
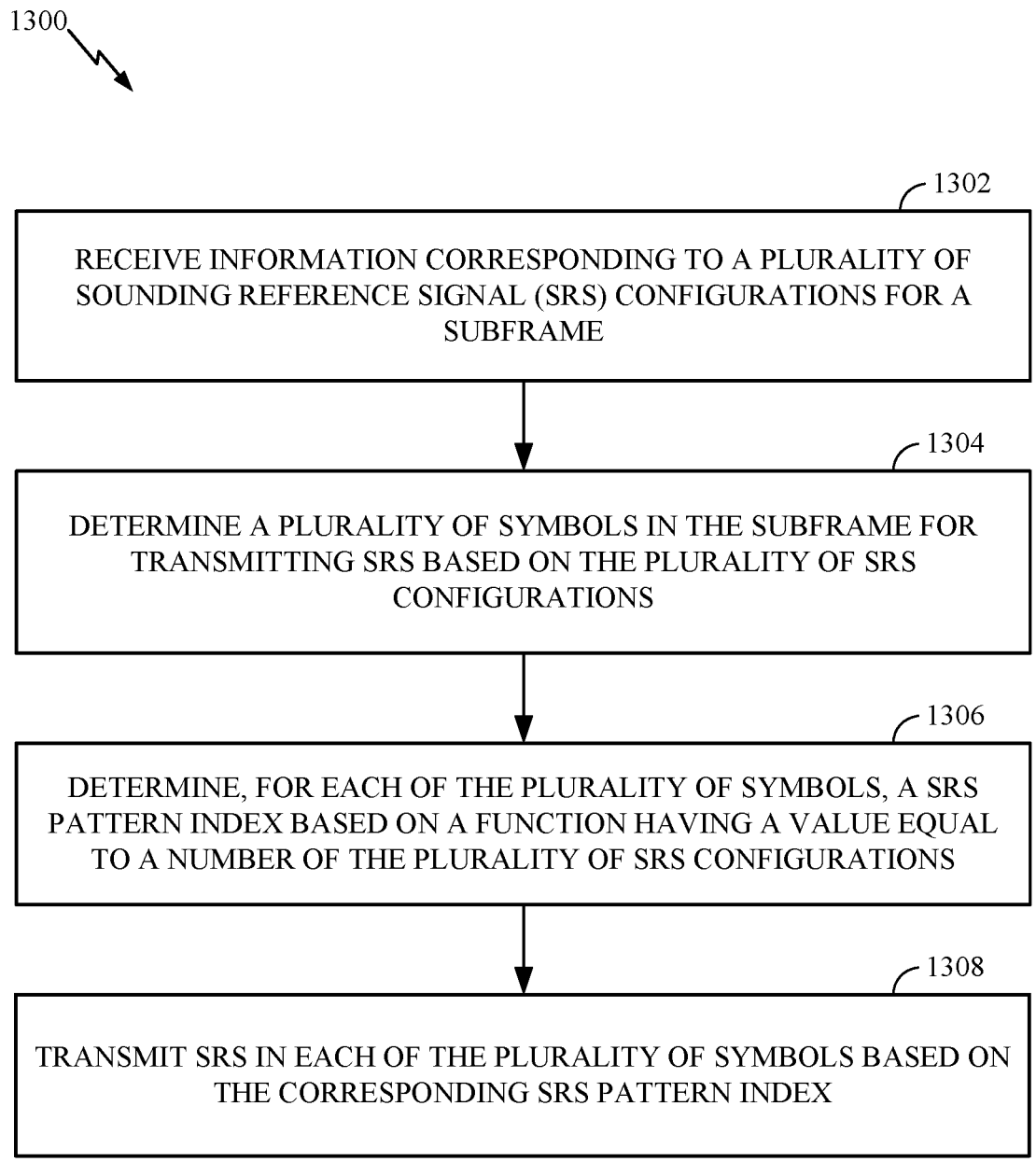
FIG. 13 illustrates example operations for SRS transmission by a UE, in accordance with certain aspects of the present disclosure.

The controller/processor 680 and/or other processors, components and/or modules at the UE 650 may perform or direct operations, for example operations 1000 or 1300 in FIGS. 10 and 13, and/or other processes or techniques described herein for SRS transmission. The controller/processor 640 and/or other processors, components and/or modules at the eNB 610 may perform or direct operations, processes or techniques described herein for configuration of a UE for SRS transmission. In certain aspects, one or more of any of the components shown in FIG. 6 may be employed to perform operations, and/or other processes for the techniques described herein. The memories 642 and 682 may store data and program codes for the UE 650 and eNB 610 respectively, accessible and executable by one or more other components of the UE 650 and the eNB 610.

Example SRS Transmission

In wireless communication systems, such as the wireless communication system 100 described above with respect to FIG. 1, user equipment (UE) (e.g., UE 102 described with respect to FIG. 1) may transmit sounding reference signals (SRSs) so that the network/base station (e.g., eNB 106 described with respect to FIG. 1, hereinafter referred to as BS 106) can measure uplink channel quality.

Conventionally, UE 102 is configured to transmit SRS in one or more symbols of a subframe. In certain aspects, UE 102 is configured to transmit SRS in a special subframe. In this context, a "normal subframe" is contrasted with a "special subframe" such as those defined and placed between "normal DL subframes" and "normal UL subframes" that allow a UE to switch between receive and transmit processing. The special subframe includes one or more uplink pilot time slot (UpPTS). In particular, in certain aspects, the UE 102 is configured to transmit SRS only in the one or more UpPTS. In some examples, the UE may receive no more than one SRS configuration indicating SRS transmission on symbols that are not within a UpPTS subframe. In certain aspects, the special subframe is transmitted by UE 102 using a TDD configuration.

For example, UE 102 receives information corresponding to one or more SRS configurations (e.g., for the subframe) from BS 106 and determines the one or more symbols in which to transmit SRS (e.g., in a subframe) based on the one or more SRS configurations. In certain aspects, BS 106 configures the UE 102 with the one or more SRS configurations through RRC configuration using RRC signaling. In certain aspects, the information corresponding to a SRS configuration comprises a SRS configuration index $I_{SRS}$ (e.g., as defined in 3GPP TS 36.213). In certain aspects, UE 102 includes a table that maps $I_{SRS}$ to a SRS periodicity $T_{SRS}$ (e.g., in ms) and a SRS subframe offset $T_{offset}$. In certain aspects, $T_{SRS}$ indicates a periodicity with which UE 102 is to transmit SRS. In certain aspects, $T_{offset}$ indicates an offset in terms of number of symbols (e.g., from the starting symbol of the symbol candidates for SRS transmission) in which to transmit SRS.

In certain aspects, UE 102 is configured to calculate a SRS pattern index $n_{SRS}$ for each symbol indicated by a SRS configuration in which SRS is to be transmitted in the subframe. For example, UE 102 calculates or determines $n_{SRS}$ for a given symbol indicated by a given SRS configuration based on the following equation (1):

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor & \text{for 2 ms } SRS \text{ periodicity} \\ \left[ \left( 10n_f + \lfloor \frac{n_s}{10} \rfloor \right) \right] / T_{SRS} & \text{otherwise} \end{cases} \quad (1)$$

where:

$N_{SP}$ is the number of UpPTS in the radio frame including the symbol (e.g., for TDD);

$n_f$ is the frame number of the radio frame including the symbol;

$n_s$ is the slot number of the subframe including the symbol; and $T_{offset_{max}}$ is the maximum value for $T_{offset}$ for the SRS configuration.

In certain legacy operations, UE 102 is configured to transmit SRS on only up to two symbols of UpPTS (referred to as UpPTS symbols) in a special subframe. In certain aspects, a SRS configuration indicates one or two UpPTS symbols. Accordingly, in such legacy operations, BS 106 configures UE 102 with only a single SRS configuration for a given subframe to indicate up to two UpPTS symbols in which to transmit SRS.

In certain aspects, UE 102 is configured or allowed to transmit SRS on more than two UpPTS symbols in the same subframe (e.g., for aperiodic SRS and/or periodic SRS). In certain aspects, UE 102 is configured or allowed to transmit the SRS on more than two symbols of UpPTS in the same subframe on the same component carrier (CC) or on multiple CCs. Further, in certain aspects, up to six UpPTS symbols can be used by UE 102 for SRS transmission per CC in one UpPTS (i.e., the UE 102 can transmit SRS on up to four additional UpPTS symbols beyond the two legacy UpPTS symbols discussed). Accordingly, in certain aspects, UE 102 is configured with a plurality of SRS configurations for the same subframe, and the UE 102 transmits SRS in the plurality of UpPTS symbols indicated by the plurality of SRS configurations (e.g., up to 6). The BS 106 may be configured to determine which UpPTS symbols will work together and configure UE 102 accordingly with corresponding SRS configurations. It should be noted that though certain aspects herein are described with respect to transmitting SRS in UpPTS symbols of a special subframe (e.g., not including uplink control information or uplink data), the techniques may similarly be applied to transmitting SRS in other symbols, such as in a regular UL subframe (e.g., including uplink control information or uplink data).

For example, UE 102 may be configured by BS 106 with three SRS configurations (e.g., each indicating up to two UpPTS symbols) including a first configuration, a second configuration, and a third configuration, referred to as example 1. The first configuration corresponds to $I_{SRS}=0$ (e.g., and indicates two of the four additional UpPTS symbols). The second configuration corresponds to $I_{SRS}=7$ (e.g., and indicates two of the four additional UpPTS symbols). The third configuration corresponds to $I_{SRS}=0$ (e.g., and indicates the two legacy UpPTS symbols). $I_{SRS}=0$ maps to $T_{SRS}=2$ ms and $T_{offset}=\{0, 1\}$, and thus $n_{srs}=\{2n_f, 2n_f+1\}$ based on equation (1) if there is one UpPTS per frame, e.g., $N_{SP}=1$. $I_{SRS}=7$ maps to $T_{SRS}=2$ ms and $T_{offset}=\{2,3\}$, and thus $n_{srs}=\{2n_f, 2n_f+1\}$ based on equation (1). Accordingly, UE 102 maps the three SRS configurations to UpPTS symbols of the first subframe in each of radio frames of and $n_f+1$ as shown in FIG. 7, which illustrates a table showing UpPTS symbols and $n_{SRS}$ for UpPTS symbols corresponding to example SRS configurations. $k_{SRS}$ is an index for each of the additional UpPTS symbols and each of the legacy UpPTS symbols (e.g., as defined in 3GPP TS 36.213). In certain aspects, UE 102 is configured to determine the position of each UpPTS symbol in the subframe based on a function of $k_{SRS}$ and $T_{offset}$ (e.g., $(k_{SRS}-T_{offset})$ mod 5=0 in case of $T_{SRS}=2$ ms). As shown in FIG. 7, each SRS configuration has the same $n_{srs}=\{2n_f, 2n_f+1\}$ pattern.

In another example, UE 102 may be configured by BS 106 with six SRS configurations (e.g., each indicating one UpPTS symbol) including a first configuration, a second configuration, a third configuration, a fourth configuration, a fifth configuration, and a sixth configuration, referred to as example 2. The first configuration through fourth configuration correspond to $I_{SRS}=10\text{-}13$, respectively (e.g., and indicate the four additional UpPTS symbols). The fifth configuration and sixth configuration correspond to $I_{SRS}=10$ and 11, respectively (e.g., and indicate the two legacy UpPTS symbols). $I_{SRS}=10\text{-}13$ map to $T_{SRS}=10$ ms and $T_{offset}=0, 1, 2,$ and 3, respectively, and thus $n_{srs}=n_f$ based on equation (1). $I_{SRS}=10$ and 11 map to $T_{SRS}=10$ ms and $T_{offset}=0$ and 1, respectively, and thus $n_{srs}=n_f$ based on equation (1). Accordingly, UE 102 maps the six SRS configurations to UpPTS symbols of the first subframe in each of radio frames $n_f$ and $n_f+1$ as shown in FIG. 8, which illustrates a table showing UpPTS symbols and $n_{SRS}$ for UpPTS symbols corresponding to example SRS configurations. In certain aspects, UE 102 is configured to determine the position of each UpPTS symbol in the subframe based on a function of $k_{SRS}$ and $T_{offset}$ (e.g., $(10 n_f + k_{SRS} - T_{offset})$ mod $T_{SRS}=0$ for $T_{SRS}>2$ ms). As shown in FIG. 8, each SRS configuration and accordingly each UpPTS symbol has the same $n_{srs}=n_f$.

In certain aspects, UE 102 is configured to use one or more of SRS carrier switching and SRS antenna switching to transmit SRS. For example, for SRS carrier switching, UE 102 may be configured to transmit SRS in different frequency bands for one or multiple UpPTS symbols over a time period (e.g., over a subframe, over a frame, over multiple frames), such as on a configured CC without PUCCH/PUSCH. In certain aspects, UE 102 is configured to transmit SRS in different frequency bands for different UpPTS symbols over whatever time period is needed so that SRS is transmitted in each frequency band of a plurality of (e.g., defined) frequency bands.

For SRS antenna switching, UE 102 may be configured to transmit SRS using different antenna sets (e.g., each antenna set corresponding to at least one antenna or at least one antenna pair) for different UpPTS symbols over a time period (e.g., over a subframe, over a frame, over multiple frames). In certain aspects, UE 102 is configured to transmit SRS in different antenna sets for different UpPTS symbols over whatever time period is needed so that SRS is transmitted in each antenna set of a plurality of (e.g., defined) antenna sets. In certain aspects, antenna switching (AS) may refer to one of 1 transmit 2 receive antennas (1T2R), 1 transmit 4 receive antennas (1T4R), or 2 transmit 4 receive antennas (2T4R).

In certain aspects, the UE 102 determines which frequency band and/or antenna set over which to transmit SRS in a given symbol based on the value of $n_{srs}$ associated with the symbol. For example, for AS 1T2R and AS 2T4R without frequency hopping UE 102 determines an antenna set index $a_{SRS}$ (e.g., an antenna index for SRS AS 1T2R or an antenna pair index for SRS AS 2T4R) as follows: $a_{SRS}=n_{SRS}$ mod 2=$\{0, 1, \ldots\}$. For AS 1T4R without frequency hopping UE 102 determines $a_{SRS}$ as follows: $a_{SRS}=n_{SRS}$ mod 4=$\{0, 1, 2, 3\ldots\}$. $a_{SRS}$ maps to one or more antennas (e.g., virtual or physical) or one or more antenna pairs.

As discussed however, different SRS configurations may correspond to the same $n_{SRS}$ in certain cases (e.g., see FIGS. 7 and 8), and thus the same $a_{SRS}$ in the same subframe. Accordingly, the UE 102 may transmit SRS on the same one or more antenna sets (e.g., and similarly the same frequency band) for a period of time, before transmitting SRS on different one or more antenna sets. Therefore, it may take the UE 102 a long period of time to transmit SRS on all antenna sets as part of AS, thereby increasing the latency for BS 106 to get channel state information (CSI) about one or more antenna sets. Without such CSI timely updated, DL throughput between BS 106 and UE 102 may be degraded for the period of latency, thereby reducing overall DL throughput between BS 106 and UE 102.

For example, FIG. 9 illustrates a table showing UpPTS symbols and $n_{SRS}$ for UpPTS symbols corresponding to example SRS configurations, including $a_{SRS}$ values for each of Example 1 (e.g., corresponding to FIG. 7) and Example 2 (e.g., corresponding to FIG. 8) for each of AS 1T2R, 2T4R, and 1T4R. As shown, for Example 1, 1T4R, antennas associated with antenna indices 0 and 1 are used to transmit SRS on every two configured SRS symbols in the first frame $n_f$, but antennas associated with antenna indices 2 and 3 are not used to transmit SRS until the next UpPTS of the frame $n_f+1$, meaning there is latency of at least one frame (e.g., 10 ms) for transmission of SRS in such antenna pairs after SRS configuration. Further, as shown in Example 2, the antenna or antenna pair associated with $a_{SRS}=1$ for 1T2R, 2T4R, or 1T4R is not used to transmit SRS until a next frame as well, meaning there is latency of at least one frame. Further, as shown in Example 2, the antenna associated with $a_{SRS}=4$ for 1T4R is not used to transmit SRS until 3 additional frames, meaning there is latency of at least three frames. A larger configured SRS periodicity (e.g., 20 ms, 40 ms, 80 ms, 160 ms, or 320 ms) would further increase the latency of SRS AS to transmit SRS on all the antennas/antenna pairs.

In certain aspects, UE 102 may similarly have latency for transmitting SRS in a plurality of frequency bands or subbands for frequency hopping when using SRS carrier switching. In particular, UE 102 may map $n_{SRS}$ to the same one or more frequency bands for a period of time based on functions, tables, etc. used to map $n_{SRS}$ to frequency bands. In certain aspects, BS 106 is configured to configure UE 102 (e.g., using RRC signaling) with a frequency offset (e.g., to indicate starting frequency band index) for a SRS configuration. Accordingly, the frequency band selected by UE 102 for transmitting SRS is based on $n_{SRS}$ and the frequency offset for the SRS configuration. In certain such aspects, UE 102 may not repeat the SRS transmission on the same antenna sets and/or same frequency bands for multiple SRS configurations as the combination of $n_{SRS}$ and different frequency offset ensures SRS is transmitted on the plurality of frequency bands with less latency. However, in certain aspects, BS 106 does not configure UE 102 with such a frequency offset for each SRS configuration, or may use the same frequency offset for some or all of the SRS configurations associated with a subframe.

In certain aspects, BS 106 is configured to indicate a starting antenna set index $a_{SRS,start}$ (or equivalently $n_{SRS,start}$ to get $a_{SRS,start}$) for each SRS configuration associated with a subframe to UE 102, such as part of RRC signaling. In certain aspects, if $a_{SRS,start}$ is not configured for a SRS configuration, the default value is 0 or the same as that of legacy UE with only one SRS configuration. For example, UE 102 determines $a_{SRS}$ as a function of $a_{SRS,start}$ and $n_{SRS}$ (e.g., as a function of $n_{SRS}$ as discussed summed with $a_{SRS,start}$)

FIG. 10 illustrates example operations 1000 for SRS transmission by a UE (e.g., UE 102), in accordance with certain aspects of the present disclosure.

Operations 1000 begin at block 1002, by UE 102 receiving information corresponding to a plurality of sounding reference signal (SRS) configurations for a subframe, the information comprising an indication of a starting antenna index or a starting antenna pair index for each of the plurality of SRS configurations. Continuing, at block 1004, UE 102 determines a plurality of symbols in the subframe for transmitting SRS based on the plurality of SRS configurations. Further, at block 1006, UE 102, determines, for each of the plurality of symbols, a SRS pattern index based on the received information.

At block 1008, UE 102, for each of the plurality of symbols, determines at least one antenna or at least one antenna pair to use for transmitting the SRS based on the corresponding SRS pattern index and starting antenna index or starting antenna pair index. Also at block 1008, UE 102, for each of the plurality of symbols, transmits the SRS on the at least one antenna or the at least one antenna pair in the symbol.

In certain aspects, by BS 106 indicating a starting antenna set index, UE 102 may not have latency issues, and therefore better DL throughput, as the combination of $n_{SRS}$ and a starting antenna set index ensures SRS is transmitted on the plurality of antenna sets without latency.

For example, UE 102 may be configured by BS 106 with two SRS configurations (e.g., each indicating up to two UpPTS symbols) including a first configuration and a second configuration, referred to as example 3. The first configuration corresponds to $I_{SRS}=0$ (e.g., and indicates two of up to four additional UpPTS symbols) and $a_{SRS,start}=0$. The second configuration corresponds to $I_{SRS}=0$ (e.g., and indicates the two legacy UpPTS symbols) and $a_{SRS,start}=2$. $I_{SRS}=0$ maps to $T_{SRS}=2$ ms and $T_{offset}=\{0,1\}$, and thus $n_{srs}=\{2n_f, 2n_f+1\}$ based on equation (1). However, even though the first configuration and second configuration have the same $n_{srs}$ pattern, they have different $a_{SRS}$ patterns based on the different $a_{SRS,start}$. For example, FIG. 11 illustrates a table showing UpPTS symbols and $n_{SRS}$ for UpPTS symbols corresponding to example SRS configurations, including $a_{SRS}$ values for Example 3.

In certain aspects, UE 102, instead (or in other cases in addition to) of receiving an indication of starting antenna set index for each SRS configuration from BS 106, utilizes a different technique than equation (1) for calculating $n_{SRS}$ that can lead to different $n_{SRS}$ values for different SRS configurations based on the $I_{SRS}$ for a given subframe. Accordingly, UE 102 may solve the SRS latency issues, and therefore achieve better DL throughput based on timely SRS-based scheduling, as the $n_{SRS}$ values ensure SRS is transmitted on the plurality of antenna sets and/or frequency bands (e.g., when BS 106 does not configure UE 102 with a frequency offset for each SRS configuration, or uses the same frequency offset for some or all of the SRS configurations associated with a subframe) on more than one symbol in a subframe. Further, by not communicating a starting antenna set index for each SRS configuration from BS 106 to UE 102, no additional signaling is needed, similar to legacy signaling.

In particular, in certain aspects, $n_{SRS}$ is determined further based on a number of SRS configurations $N_{SRSConfig}$ in the plurality of SRS configurations. Further, in certain aspects, $n_{SRS}$ for a given SRS configuration is determined further based on an order index $n_{SRSConfig}$ of the SRS configuration. For example, UE 102 calculates or determines $n_{SRS}$ for a given symbol indicated by a given SRS configuration based on the following equation (2) (e.g., for TDD):

$$n_{SRS} = \begin{cases} N_{SRSConfig}(2N_{SP}n_f + 2(N_{SP}-1)) & \text{for 2 ms periodicity} \\ \left\lfloor \frac{n_s}{10} \right\rfloor \right) + \left\lfloor \frac{T_{offset}}{T_{offset\_max}} \right\rfloor + 2n_{SRSConfig} & \\ N_{SRSConfig}\left\lfloor \left(10n_f + \left\lfloor \frac{n_s}{2} \right\rfloor \right) / T_{SRS} \right\rfloor + n_{SRSConfig} & \text{otherwise} \end{cases}$$

In certain aspects, UE 102 is configured to use equation 2 to determine $n_{SRS}$ for SRS antenna switching and/or carrier switching.

In an example, if BS 106 configures UE 102 to utilize 3 SRS configurations for a subframe, $N_{SRSConfig}$ equals 3 for each of the symbols/SRS configurations, and $n_{SRSConfig}$ equals a different one of $\{0, \ldots N_{SRSConfig}-1\}$ for each of the 3 SRS configurations. In certain aspects, the BS 106 explicitly indicates to UE 102 $N_{SRSConfig}$ and also $n_{SRSConfig}$ (for each of the SRS configurations). In certain aspects, UE 102 implicitly determines $N_{SRSConfig}$ and also $n_{SRSConfig}$ (for each of the SRS configurations). For example, UE 102 determines $N_{SRSConfig}$ as the number of SRS configurations configured for more than one SRS symbol in a subframe used for the same type of SRS transmission (e.g., periodic SRS or aperiodic SRS). Further, in certain aspects, UE 102 is configured to order the SRS configurations and assign $n_{SRSConfig}$ in that order based on one or more parameters, such as $I_{SRS}$ associated with the SRS configurations (e.g., in increasing order) or whether the SRS configuration is for the plurality of legacy symbols or the plurality of additional symbols (e.g., additional symbols ordered ahead of legacy symbols).

It should be noted that equation (2) is compatible with equation (1) in that when used for a single SRS configuration like in legacy operation, it is the same as equation (1) (i.e., $N_{SRSConfig}=1$ and $n_{SRSConfig}=0$ for the case of only one SRS configuration).

In an example, UE 102 may be configured by BS 106 with two SRS configurations (e.g., each indicating up to two UpPTS symbols) including a first configuration and a second configuration, referred to as example 4. The first configuration corresponds to $I_{SRS}=0$ (e.g., and indicates two of up to four additional UpPTS symbols) and $n_{SRSConfig}=0$. The second configuration corresponds to $I_{SRS}=0$ (e.g., and indicates the two legacy UpPTS symbols) and $n_{SRSConfig}=1$. $I_{SRS}=0$ maps to $T_{SRS}=2$ ms and $T_{offset}=\{0,1\}$ for both the first configuration and the second configuration. However, for the first configuration, $n_{srs}=\{4n_f, 4n_f+1\}$ based on equation (2), and for the second configuration, $n_{srs}=\{4n_f+2, 4n_f+3\}$ based on equation (2). Accordingly, the first configuration and second configuration have different $n_{srs}$ patterns and thus map to different $a_{SRS}$ patterns and/or frequency band patterns. For example, FIG. 12 illustrates a table showing UpPTS symbols and $n_{SRS}$ for UpPTS symbols corresponding to example SRS configurations, including $a_{SRS}$ values for Example 4.

In certain aspects, UE 102 is configured to or determines to use equation (2) to determine $n_{SRS}$ when UE 102 is configured with more than one SRS configuration (e.g., for more than one symbol in a subframe), which may be used for a UE to transmit more than one SRS symbol in a subframe on a CC with no PUCCH/PUSCH for SRS carrier switching or for a BL/CE UE in CEModeA to transmit more than one SRS symbol in a subframe. In certain aspects, UE 102 is configured to or determines to use equation (2) to determine $n_{SRS}$ when the UE 102 is configured with more than one SRS configuration (e.g., for a subframe) and the UE 102 is configured to use antenna-switching for transmitting SRS. In certain aspects, UE 102 is configured to or determines to use equation (2) to determine $n_{SRS}$ when using frequency hopping for transmitting SRS and either of not receiving information regarding a starting frequency offset for frequency hopping or receiving information regarding a common starting frequency offset for frequency hopping.

FIG. 13 illustrates example operations 1300 for SRS transmission by a UE (e.g., UE 102), in accordance with certain aspects of the present disclosure.

Operations 1300 begin at block 1302, by UE 102 receiving information corresponding to a plurality of sounding reference signal (SRS) configurations for a subframe. Continuing, at block 1304, UE 102 determines a plurality of symbols in the subframe for transmitting SRS based on the plurality of SRS configurations. Further, at block 1306, UE 102, determines, for each of the plurality of symbols, a SRS pattern index based on a function having a value equal to a number of the plurality of SRS configurations. At block 1308, UE 102 transmits SRS in each of the plurality of symbols based on the corresponding SRS pattern index.

In certain aspects, transmitting SRS in each of the plurality of symbols based on the corresponding SRS pattern index comprises, for each of the plurality of symbols: determining at least one antenna or at least one antenna pair to use for transmitting the SRS based on the corresponding SRS pattern index, and transmitting the SRS on the at least one antenna or at least one antenna pair in the symbol.

In certain aspects, transmitting SRS in each of the plurality of symbols based on the corresponding SRS pattern index comprises, for each of the plurality of symbols: determining at least one frequency band to use for transmitting the SRS based on the corresponding SRS pattern index, and transmitting the SRS on the at least one frequency band in the symbol.

In certain aspects, each of the plurality of SRS configurations is associated with an order index, and the function further includes a second parameter having a value equal to the order index of the SRS configuration associated with the symbol for which the SRS pattern index is being determined. In certain such aspects, the received information comprises, for each of the plurality of SRS configurations, a SRS configuration index that maps to a periodicity and a subframe offset, wherein the order index for each of the plurality of SRS configurations is based on the corresponding SRS configuration index. In certain such aspects, the plurality of symbols comprises a plurality of legacy symbols and a plurality of additional symbols, wherein the received information comprises, for each of the plurality of SRS configurations, a SRS configuration index that maps to a periodicity and a subframe offset, wherein the order index for each of the plurality of SRS configurations is based on whether the SRS configuration is for the plurality of legacy symbols or the plurality of additional symbols.

In certain aspects, the function further includes one or more additional parameters having one or more values equal to any combination of a frame number of a frame including the subframe, a number of symbols available for transmitting SRS in the frame, a subframe offset corresponding to the symbol, a slot number of the slot including the symbol, a maximum subframe offset, and/or a periodicity.

In certain aspects, receiving information corresponding to the plurality of SRS configurations further comprises receiving a single SRS configuration indicating SRS transmission on multiple symbols in different subframes within one half of a frame.

In certain aspects, operation 1300 further include determining to use the function based on receiving information corresponding to more than one SRS configuration (e.g., determining to use the function based on the receiving of the information corresponding to the plurality of SRS configuration).

In certain aspects, operation 1300 further include determining to use the function based on receiving information corresponding to more than one SRS configuration and based on using antenna switching for transmitting SRS (e.g., determining to use the function based on the receiving of the information corresponding to the plurality of SRS configurations and further based on using antenna switching for transmitting SRS).

In certain aspects, operation 1300 further include determining to use the function based on receiving information corresponding to more than one SRS configuration and based on using frequency hopping for transmitting SRS and either of not receiving information regarding a frequency offset (e.g., starting frequency band) for frequency hopping or receiving information regarding a common frequency offset for frequency hopping (e.g., determining to use the function based on the receiving of the information corresponding to the plurality of SRS configurations and further based on using frequency hopping for transmitting SRS and either of not receiving information regarding a frequency offset for frequency hopping or receiving information regarding a common frequency offset for frequency hopping).

In certain aspects, the subframe is an uplink subframe for transmission of one or more of uplink control information or uplink data and/or SRS.

In certain aspects, the subframe is a special subframe including at least one uplink pilot time slot.

In certain aspects, all of the plurality of SRS configurations indicate symbols in the same subframe. In certain aspects, none of the plurality of SRS configurations individually indicates symbols in more than one subframe. For example, in certain aspects, as discussed, UE 102 is configured to transmit SRS only in the one or more UpPTS. However, in certain aspects, BS 106 may configure UE 102 with a plurality of SRS configurations, and one or more of the plurality of SRS configurations may indicate a symbol outside of UpPTS. In certain aspects, UE 102 is configured to ignore such one or more of the plurality of SRS configurations in their entirety and not transmit SRS on any of the corresponding symbols. In certain aspects, UE 102 is configured to just not transmit SRS on any symbols outside of UpPTS indicated by the one or more of the plurality of SRS configurations, but still transmits SRS on other indicated symbols within UpPTS. In an example, this can occur when the BS 106 configures SRS configurations including SRS symbols in different subframes per frame. Accordingly, the UE 102 may not be expected to receive more than one SRS configuration indicating SRS transmission on multiple symbols in different subframes within a half frame (e.g., half frame of FIG. 3). In some examples, the UE 102 may receive a single SRS configuration from the BS 106 indicating SRS transmission on multiple symbols in different subframes within the half frame.

Additional Considerations

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in [[FIG. x and/or FIG. Y]].

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   receiving information corresponding to a plurality of sounding reference signal (SRS) configurations for a subframe;
   determining a plurality of symbols in the subframe for transmitting SRS based on the plurality of SRS configurations;
   determining, for each of the plurality of symbols, a SRS pattern index based on a function having at least one output value including a value equal to a number of the plurality of SRS configurations; and
   transmitting SRS in each of the plurality of symbols based on the corresponding SRS pattern index.

2. The method of claim 1, wherein transmitting SRS in each of the plurality of symbols based on the corresponding SRS pattern index comprises, for each of the plurality of symbols:
   determining at least one antenna or at least one antenna pair to use for transmitting the SRS based on the corresponding SRS pattern index; and
   transmitting the SRS on the at least one antenna or at least one antenna pair in the symbol.

3. The method of claim 1, wherein transmitting SRS in each of the plurality of symbols based on the corresponding SRS pattern index comprises, for each of the plurality of symbols:
   determining at least one frequency band to use for transmitting the SRS based on the corresponding SRS pattern index; and
   transmitting the SRS on the at least one frequency band in the symbol.

4. The method of claim 1, wherein each of the plurality of SRS configurations is associated with an order index, and wherein the at least one output value further includes a value equal to the order index of the SRS configuration associated with the symbol for which the SRS pattern index is being determined.

5. The method of claim 4, wherein the received information comprises, for each of the plurality of SRS configurations, a SRS configuration index that maps to a periodicity and a subframe offset, wherein the order index for each of the plurality of SRS configurations is based on the corresponding SRS configuration index.

6. The method of claim 4, wherein the plurality of symbols comprises a plurality of legacy symbols and a plurality of additional symbols, wherein the received information comprises, for each of the plurality of SRS configurations, a SRS configuration index that maps to a periodicity and a subframe offset, wherein the order index for each of the plurality of SRS configurations is based on whether the SRS configuration is for the plurality of legacy symbols or the plurality of additional symbols.

7. The method of claim 1, wherein the at least one output value further includes one or more additional values equal to any combination of a frame number of a frame including the subframe, a number of symbols available for transmitting SRS in the frame, a subframe offset corresponding to the symbol, a slot number of the slot including the symbol, a maximum subframe offset, and a periodicity.

8. The method of claim 1, wherein receiving information corresponding to the plurality of SRS configurations further comprises receiving a single SRS configuration indicating SRS transmission on multiple symbols in different subframes within one half of a frame.

9. The method of claim 1, further comprising:
determining to use the function based on the receiving of the information corresponding to the plurality of SRS configuration.

10. The method of claim 1, further comprising:
determining to use the function based on the receiving of the information corresponding to the plurality of SRS configurations and further based on using antenna switching for transmitting SRS.

11. The method of claim 1, further comprising:
determining to use the function based on the receiving of the information corresponding to the plurality of SRS configurations and further based on using frequency hopping for transmitting SRS and either of not receiving information regarding a frequency offset for frequency hopping or receiving information regarding a common frequency offset for frequency hopping.

12. The method of claim 1, wherein the subframe is an uplink subframe for transmission of one or more of uplink control information or uplink data.

13. The method of claim 1, wherein the subframe is a special subframe including at least one uplink pilot time slot.

14. The method of claim 1, wherein all of the plurality of SRS configurations indicate symbols in the same subframe.

15. The method of claim 1, wherein none of the plurality of SRS configurations individually indicates symbols in more than one subframe.

16. A method of wireless communication by a user equipment (UE), comprising:
receiving information corresponding to a plurality of sounding reference signal (SRS) configurations for a subframe, the information comprising an indication of a starting antenna index or a starting antenna pair index for each of the plurality of SRS configurations;
determining a plurality of symbols in the subframe for transmitting SRS based on the plurality of SRS configurations;
determining, for each of the plurality of symbols, a SRS pattern index based on the received information; and
for each of the plurality of symbols:
determining at least one antenna or at least one antenna pair to use for transmitting the SRS based on the corresponding SRS pattern index and starting antenna index or starting antenna pair index; and
transmitting the SRS on the at least one antenna or the at least one antenna pair in the symbol.

17. A user equipment (UE), comprising:
a memory; and
a processor communicatively coupled to the memory, wherein the processor is configured to:
receive information corresponding to a plurality of sounding reference signal (SRS) configurations for a subframe;
determine a plurality of symbols in the subframe for transmitting SRS based on the plurality of SRS configurations;
determine, for each of the plurality of symbols, a SRS pattern index based on a function having at least one output value including a value equal to a number of the plurality of SRS configurations; and
transmit SRS in each of the plurality of symbols based on the corresponding SRS pattern index.

18. The UE of claim 17, wherein the processor, being configured to transmit SRS in each of the plurality of symbols based on the corresponding SRS pattern index, is further configured to:
determine, for each of the plurality of symbols, at least one antenna or at least one antenna pair to use for transmission of the SRS based on the corresponding SRS pattern index; and
transmit the SRS on the at least one antenna or at least one antenna pair in the symbol.

19. The UE of claim 17, wherein the processor, being configured to transmit SRS in each of the plurality of symbols based on the corresponding SRS pattern index, is further configured to:
determine, for each of the plurality of symbols, at least one frequency band to use for transmission of the SRS based on the corresponding SRS pattern index; and
transmit the SRS on the at least one frequency band in the symbol.

20. The UE of claim 17, wherein each of the plurality of SRS configurations is associated with an order index, and wherein the at least one output value further includes a value equal to the order index of the SRS configuration associated with the symbol for which the SRS pattern index is being determined.

21. The UE of claim 20, wherein the received information comprises, for each of the plurality of SRS configurations, a SRS configuration index that maps to a periodicity and a subframe offset, wherein the order index for each of the plurality of SRS configurations is based on the corresponding SRS configuration index.

22. The UE of claim 20, wherein the plurality of symbols comprises a plurality of legacy symbols and a plurality of additional symbols, wherein the received information comprises, for each of the plurality of SRS configurations, a SRS configuration index that maps to a periodicity and a subframe offset, wherein the order index for each of the plurality of SRS configurations is based on whether the SRS configuration is for the plurality of legacy symbols or the plurality of additional symbols.

23. The UE of claim 17, wherein the at least one output value further includes one or more additional values equal to any combination of a frame number of a frame including the subframe, a number of symbols available for transmitting SRS in the frame, a subframe offset corresponding to the symbol, a slot number of the slot including the symbol, a maximum subframe offset, and a periodicity.

24. The UE of claim 17, wherein the processor, being configured to receive information corresponding to the plurality of SRS configurations, is further configured to receive a single SRS configuration indicating SRS transmission on multiple symbols in different subframes within one half of a frame.

25. The UE of claim 17, wherein the processor is further configured to determine to use the function based on the received information corresponding to the plurality of SRS configuration.

26. The UE of claim 17, wherein the processor is further configured to determine to use the function based on the receiving of the information corresponding to the plurality of SRS configurations and further based on using antenna switching for transmitting SRS.

27. The UE of claim 17, wherein the processor is further configured to:
determine to use the function based on the receiving of the information corresponding to the plurality of SRS configurations and further based on using frequency hopping for transmitting SRS and either of not receiving information regarding a frequency offset for frequency hopping or receiving information regarding a common frequency offset for frequency hopping.

28. The UE of claim 17, wherein the subframe is an uplink subframe for transmission of one or more of uplink control information or uplink data.

29. The UE of claim 17, wherein none of the plurality of SRS configurations individually indicates symbols in more than one subframe.

30. A user equipment (UE), comprising:
a memory; and
a processor communicatively coupled to the memory, the processor configured to:
receive information corresponding to a plurality of sounding reference signal (SRS) configurations for a subframe, the information comprising an indication of a starting antenna index or a starting antenna pair index for each of the plurality of SRS configurations;
determine a plurality of symbols in the subframe for transmitting SRS based on the plurality of SRS configurations;
determine, for each of the plurality of symbols, a SRS pattern index based on the received information; and
for each of the plurality of symbols:
determine at least one antenna or at least one antenna pair to use for transmitting the SRS based on the corresponding SRS pattern index and starting antenna index or starting antenna pair index; and
transmit the SRS on the at least one antenna or the at least one antenna pair in the symbol.

* * * * *